(No Model.)
R. JONES.
PLOW ATTACHMENT.
No. 302,144. Patented July 15, 1884.
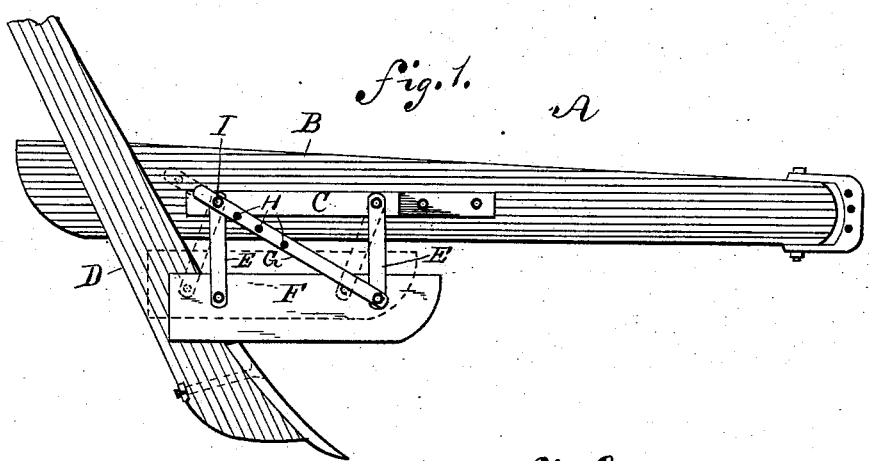
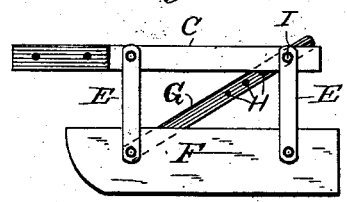
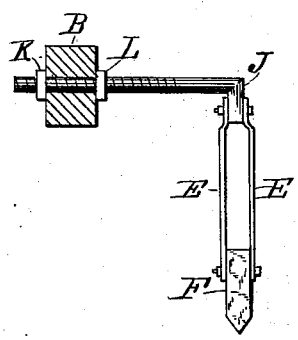
WITNESSES:
H. B. Brown
A. G. Syne.
INVENTOR:
Reuben Jones
BY Munn & Co.
ATTORNEYS.

UNITED STATES PATENT OFFICE.

REUBEN JONES, OF HOGANSVILLE, GEORGIA.

PLOW ATTACHMENT.

SPECIFICATION forming part of Letters Patent No. 302,144, dated July 15, 1884.

Application filed November 12, 1883. (No model.)

*To all whom it may concern:*

Be it known that I, REUBEN JONES, of Hogansville, in the county of Troup and State of Georgia, have invented a new and useful Improvement in Plow Attachments, of which the following is a full, clear, and exact description, reference being had to the annexed drawings, forming part of this specification.

This invention relates to the class of plow attachments for gaging the depth of furrow or the quantity of soil thrown up around young plants; and the invention consists of the novel construction hereinafter described and claimed.

In the drawings, Figure 1 is a side elevation of a plow embodying my invention. Fig. 2 is a view of the attachment removed from the plow, showing the side opposite to that shown in Fig. 1; and Fig. 3 is a view showing a modification.

A indicates a plow, to the beam B of which is attached a bar, C, which extends laterally from said beam and rearward to a point near the stock D. From the bar C is suspended, by means of connecting-links E, a guard, F, consisting of a vertically-arranged plate having its forward end shaped like a sled-runner. The links E are preferably made double, the parts being arranged on opposite sides of the bar C and plate F, and pivoted thereto, as shown. The lower end of one of the links or double links E is connected to the upper end of the other link E by means of a bar, G, to prevent the plate F from oscillating; and one end of the bar G is provided with a series of perforations, H, adapted to engage with a removable pivot, I, whereby the said lower and upper ends may be drawn nearer together or adjusted farther apart, to regulate the elevation of the guard from the ground.

As shown in Fig. 3, the links E may be suspended from two cranks, J, which are held in any desired position by means of the nuts K L, screwing on said cranks on opposite sides of the beam B.

What I claim is—

The combination, with a plow-beam and a support attached thereto, of the guard F, the links E, pivoted to and suspending the guard from said support, and means for adjusting the links on their pivots to support the guard in a higher or lower position, substantially as shown and described.

REUBEN JONES.

Witnesses:
 ISAAC JACKSON,
 J. W. HARDAWAY.